(12) United States Patent
Van Der Leest

(10) Patent No.: US 8,491,426 B2
(45) Date of Patent: Jul. 23, 2013

(54) TRANSMISSION WITH CONVEX PULLEY SHEAVES AND A DRIVE BELT

(75) Inventor: Arjan Van Der Leest, Nistelrode (NL)

(73) Assignee: Robert Bosch GmbH, Stuttgart (DE)

( * ) Notice: Subject to any disclaimer, the term of this patent is extended or adjusted under 35 U.S.C. 154(b) by 339 days.

(21) Appl. No.: 12/990,708

(22) PCT Filed: Apr. 24, 2009

(86) PCT No.: PCT/NL2009/000101
§ 371 (c)(1),
(2), (4) Date: Jan. 12, 2011

(87) PCT Pub. No.: WO2009/134122
PCT Pub. Date: Nov. 5, 2009

(65) Prior Publication Data
US 2011/0098144 A1   Apr. 28, 2011

(30) Foreign Application Priority Data
May 2, 2008   (NL) ..................................... 1035388

(51) Int. Cl.
  *F16H 55/56*   (2006.01)
  *F16H 59/00*   (2006.01)
  *F16G 1/00*   (2006.01)
(52) U.S. Cl.
  USPC .................................. 474/8; 474/12; 474/201
(58) Field of Classification Search
  USPC ................................................ 474/8, 12, 201
  See application file for complete search history.

(56) References Cited

U.S. PATENT DOCUMENTS

| 3,016,755 A * | 1/1962 | Dittrich ............................. 474/8 |
| 4,631,042 A * | 12/1986 | Rattunde ........................... 474/8 |
| 6,206,796 B1 * | 3/2001 | Lee .................................. 474/84 |
| 6,416,433 B1 * | 7/2002 | Linnenbrugger ................. 474/8 |
| 6,656,068 B2 * | 12/2003 | Aitcin ............................... 474/8 |
| 2003/0144097 A1 * | 7/2003 | Brandsma et al. ................ 474/8 |
| 2004/0162173 A1 * | 8/2004 | Yoshida ....................... 474/242 |
| 2006/0058125 A1 * | 3/2006 | Van Der Leest et al. ......... 474/8 |
| 2007/0117663 A1 | 5/2007 | Van Der Leest et al. |

FOREIGN PATENT DOCUMENTS

| EP | 1441151 A2 | 7/2004 |
| JP | 2002031215 A | 1/2002 |
| NL | 1024918 C2 | 6/2005 |
| WO | 2004053361 A1 | 6/2004 |
| WO | 2006049493 A1 | 5/2006 |
| WO | 2006068468 A1 | 6/2006 |

OTHER PUBLICATIONS

International Search Report, dated Nov. 6, 2009, from corresponding PCT application.

* cited by examiner

*Primary Examiner* — William E Dondero
*Assistant Examiner* — Minh Truong
(74) *Attorney, Agent, or Firm* — Young & Thompson

(57) ABSTRACT

A continuously variable transmission for motor vehicles is provided with a driving pulley (1) and with a driven pulley (2) around which is arranged a drive belt (3) which, at least when the transmission is operating, is clamped between two substantially conical pulley sheaves (4, 5) of the two pulleys (1, 2). The cone surface (10) of the pulley sheaves (4, 5) of the driving pulley (1) in a cross-section including the central pulley axis (9) is provided with a convex curvature having a radius of curvature (R10) that decreases in radially outward direction and the cone surface (10) of the pulley sheaves (4, 5) of the driven pulley (2) in a cross-section including the central pulley axis (9) is provided with a convex curvature having a radius of curvature (R10) that increases in radially outward direction.

16 Claims, 2 Drawing Sheets

TRANSMISSION WITH CONVEX PULLEY SHEAVES AND A DRIVE BELT

Figure 1:
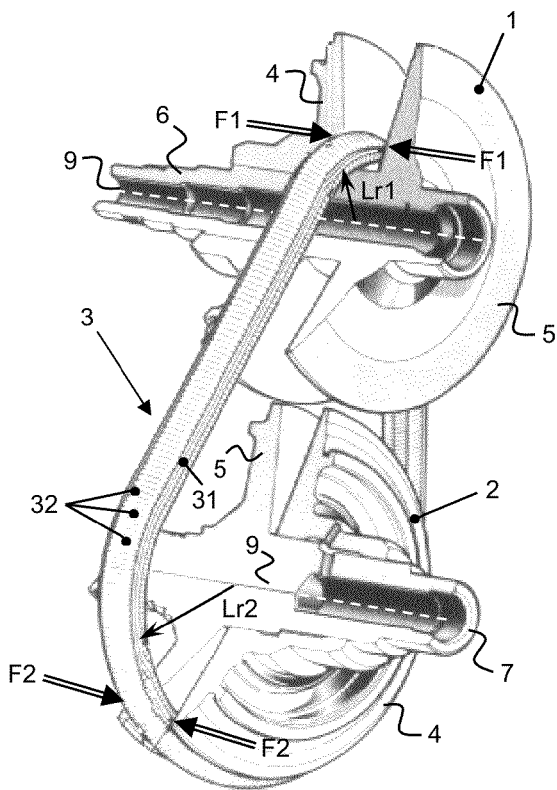

The present invention relates to a continuously variable transmission provided with a pulley with convex conical pulley sheaves and a drive belt and/or chain.

The structure and operation of a transmission of this kind is generally known and is described, for example, in Netherlands patent publication 1024918, which also shows one of the known types of drive belts. The drive belt shown is generally known as the Van Doorne push belt and is, for example, described in more detail in patent publication WO-A-2006/049493. The known push belt comprises a series of so-called transverse elements and two continuous or annular tensioning elements, with the transverse elements being accommodated in the push belt so as to be displaceable along the periphery of the tensioning elements. The known push belt comprises a number of said transverse elements which is such that at least virtually the entire circumference of the tensioning element is filled, so that, during operation, the clamping force or pinching force exerted on the drive belt by the pulley sheaves of a pulley is distributed more or less uniformly over a number of transverse elements.

More particularly, the individual transverse elements comprise a more or less trapezoidal body part and a head part which is more or less in the shape of an arrowhead, which two parts are connected to one another by means of a relatively narrow neck part of the transverse element. The lateral sides of the body part which are oriented at an acute angle to one another are in this case provided with contact surfaces for (frictional) contact with the conical pulley sheaves of a driving and a driven pulley of the transmission, while parts of the radially outwardly oriented side, that is to say the side oriented in the direction of the head part, of the body part form supporting surfaces for the tensioning elements of the push belt. The head part of the transverse elements is located radially outside the tensioning elements and retains it in said direction, while the neck part is situated at the level of the tensioning elements. The individual tensioning elements are formed by a number of nested, flat and relatively thin metal rings.

In the transmission, in each case one of the two pulley sheaves of a pulley is fixedly connected to the pulley axle, while the other pulley sheave is provided on the pulley axle so as to be axially displaceable. In this case, the axial distance between the pulley sheaves determines the radial position or running radius of the drive belt at the location of a respective pulley and the ratio between the respective running radii of the drive belt at the location of the two pulleys determines the transmission ratio of the transmission.

It is known to design the cone surface of the pulley sheaves of the transmission in the shape of an arc or convexly. In this context, the term arcuate or convex means that the straight cone shape of the surface of the pulley sheaves which is commonly used with the present type of transmission is replaced by a cone surface which is convexly curved. The relevant convex shape or contour of the cone surface is apparent in a cross-section of the pulley sheave including the central axis, i.e. the rotation axis, of the pulley axle, i.e. in a cross-section oriented in the tangential direction. Incidentally, the cone surface of a pulley sheave which may or may not be convexly curved is also referred to as a (drive belt) running surface.

Depending on said running radius, the said convex contour of the running surfaces results in variations in the contact angle, that is to say the angle with respect to the true radial direction, including that of the frictional contact between the pulley sheaves of a pulley on the one hand and the drive belt on the other hand. More particularly, the local contact angle becomes increasingly larger as the running radius increases and vice versa. NL-A-1024918 specifies a specific ratio between the limit values for the local contact angles of the pulleys for the limit running radii, which ratio is said to result in an improvement in the efficiency of the transmission. Although this document thus specifies a range of contact angles for the running surfaces and/or of the cone surface in cross section of a respective pulley sheave viewed in the tangential direction, the overall contour thereof is not specified in full and only a number of general boundary conditions are mentioned in this respect.

It is an object of the present invention to add to the known design rules for the running surface contour of the pulley sheaves in order to achieve advantageous functional properties of the transmission. It is thus an object of the present invention to provide a more specific specification for said running surface contour, which is based on the working principle of the transmission. More particularly, it is an object of the present invention to reduce the mechanical load of the drive belt in an advantageous way.

To this end, the present invention provides a transmission in which the measure as disclosed below has been implemented. With the transmission according to the invention, said running surface contour of the pulley sheaves of the driving pulley is provided with a convex curvature as seen in a cross-section including the central axis of the pulley having a radius of curvature which decreases in relation to an increasing running radius of the drive belt on said pulley, i.e. radially outward from the top to the base of the cone shape. Such a running surface contour has the advantage that the (Hertzian) contact stresses, which occur in operation during (frictional) contact between the transverse elements and the pulley sheaves of the driving pulley, are advantageously relatively small, that is given a certain range of contact angles specified therefor.

Although the radius of curvature of the running surface contour which, according to the invention, varies, will on average be approximately equal to the constant radius of curvature which describes a similar contact angle range, it has the advantage, in practice, that the change in clamping force per transverse element in relation to said running radius can at least partially be compensated for thereby. Such a difference in the clamping force exerted on the drive belt by the pulley per transverse element is caused by the fact that, due to a decreasing running radius, on the one hand the overall clamping force required for the torque transmission increases and, on the other hand, the number of transverse elements which is situated between the pulley sheaves and is clamped by the latter, decreases.

Obviously, these two effects also apply to the driven pulley, so that one could expect it to be advantageous to provide the same running surface contour to this pulley as well. Surprisingly, however, according to the present invention exactly the opposite is the case, at least specifically with regard to the use of the transmission in a motor vehicle, namely that it is advantageous to provide said running surface contour of the pulley sheaves of the driven pulley as seen in a cross-section including the central axis thereof with a convex curvature having a variable radius of curvature which increases in relation to an increasing running radius of the drive belt on said pulley.

When the transmission is used in a motor vehicle, it will be subjected to a relatively heavy load at the most decelerating transmission ratio of the transmission, albeit for a relatively short period of time, while it is, on the contrary, subjected to a much lighter load, albeit for a relatively long period of time, at the most accelerating transmission ratio. In said most decelerating transmission ratio, or Low, the (frictional) contact between the drive belt and the driven pulley takes place at the largest possible running radius, while this takes place in said most accelerating transmission ratio, or OD, at the smallest possible running radius. The influence of this last effect on the clamping force between drive belt and driven pulley in relation to the running radius compensates for the two abovementioned effects thereon according to the invention to such a degree that it is advantageous to provide the sheaves thereof with a running surface contour having a radius of curvature which increases in relation to an increasing running radius of the drive belt on this pulley in order to optimize the (Hertzian) contact stresses between the drive belt and the driven pulley.

Figure 2:
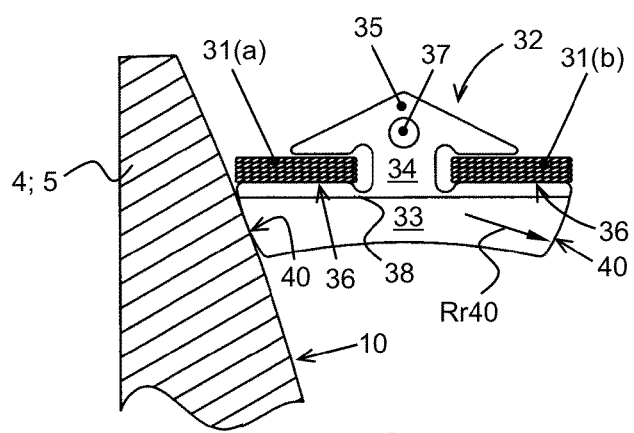
Figure 3:
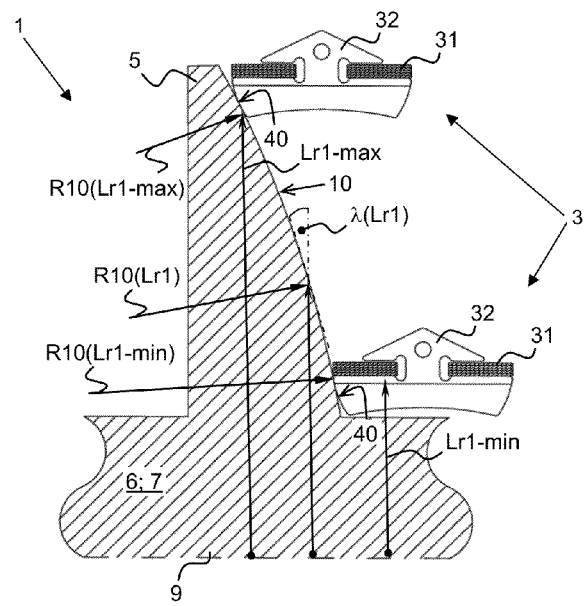
Figure 4:
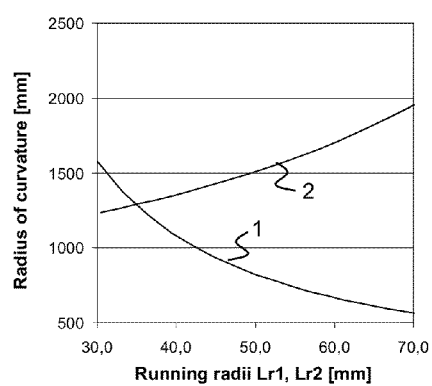
Figure 5:
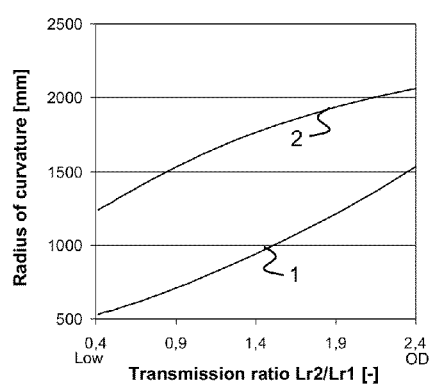

The present invention is explained below with reference to the attached figures, in which:

FIG. 1 diagrammatically and in partial cross section shows a continuously variable transmission provided with two pulleys and a drive belt according to the prior art, FIG. 2 shows a cross section of the known drive belt, FIG. 3 diagrammatically shows the frictional contact between a pulley of the transmission and the drive belt, and FIGS. 4-5 show a possible running surface contour of the transmission pulleys according to the invention in a graph.

FIG. 1 diagrammatically shows a cross section of a continuously variable transmission according to the prior art. The known transmission comprises a primary or driving pulley 1, which can be rotationally driven to this end by an engine (not shown) having a couple of forces Tp, and a secondary or driven pulley 2, which can drive a load (not shown) using a couple of forces Ts. Both pulleys 1 and 2 are provided with a pulley sheave 5 which is fixedly attached to a respective pulley axle 6, 7 and with a pulley sheave 4 which is axially displaceable with respect to this respective axle 6, 7. The pulley sheaves 4, 5 have, at least essentially, the shape of a truncated and relatively flat cone. A drive belt 3 is clamped between the pulley sheaves 4, 5, so that mechanical power can be transmitted between the two pulley axles 6 and 7 using friction.

The transmission ratio Lr2/Lr1 of the transmission is determined by the ratio between a secondary running radius Lr2 and a primary running radius Lr1 of the drive belt 20, that is to say the effective radial position thereof between the pulley sheaves 4, 5 of the driven and the driving pulley 2 and 1, respectively. Said running radii Lr1 and Lr2, and thus the transmission ratio Lr2/Lr1 of the transmission, can be varied by moving the displaceable sheaves 4 in opposite axial directions over the respective pulley axles 6 and 7. In FIG. 1, the transmission is illustrated by way of example at the most decelerating transmission ratio Lr2/Lr1, or Low, that is to say with a relatively small primary running radius Lr1 and a relatively large secondary running radius Lr2.

An axially directed force which clamps the drive belt 3 for each pulley 1, 2 and which is referred to below as the primary clamping force F1 and the secondary clamping force F2, respectively, is in this case determined and realized by a control system (not shown) of the transmission, the magnitude of a respective clamping force F1; F2 being inter alia dependent on the respective running radius Lr1; Lr2 and the respective torque T1; T2.

The drive belt 3 shown in FIG. 1 is of the so-called push belt type and consists of a virtually continuous series of transverse elements 32 and at least one, but usually two tensioning elements 31. This push belt 3 is shown in FIG. 2 in detail in a cross section which is oriented in the circumferential direction thereof, in which the transverse element 32 is shown in front view. The transverse element 32 comprises a more or less trapezoidal body part 33 and a head part 35 which is more or less in the shape of an arrowhead, which two parts 33, 35 are connected to one another by means of a relatively narrow neck part 34 of the transverse element 32. The lateral sides of the body part 35 which are oriented at an acute angle to one another are in this case provided with convexly curved contact surfaces 40 for (frictional) contact with the surface 10 of the conical pulley sheaves 4,5 of the pulleys 1, 2 of the transmission, i.e. the running surface 10 thereof. Parts of the radially outwardly oriented side, that is to say the side oriented in the direction of the head part 35, of the body part 33 form supporting surfaces 36 for the individual tensioning elements 31(a) and (b) of the push belt 3. The head part 35 of the transverse elements 3 is located radially outside the tensioning elements 31 and retains it in said direction, while the neck part 34 is situated at the level of the tensioning elements 31. The front side of the transverse element 32 is furthermore provided with a protuberance 37 in the circumferential direction of the push belt 3, or stud 37, as well as with a depression (not shown) arranged in an opposite rear side of the transverse element 32, which stud 37 is accommodated in the depression of an adjacent transverse element 32 in the push belt 3 for stabilizing the latter with respect to one another. The lowermost, or radially innermost part of the transverse element 32 below a so-called tilting line 38 at the front side of the transverse element 32 runs radially inwards, at least in fact tapers, so that adjacent transverse elements 32 in the push belt 3 can tilt about the tilting line 38 with respect to one another and the push belt 3 can describe an arc, for example where it is clamped between the pulley sheaves 4, 5 of the pulleys 1 and 2.

The individual tensioning elements 31(a) and (b) consist of a set of a number of flat and relatively thin metal rings which are stacked in the radial direction. The tensioning elements 31 and the transverse elements 32 retain one another in the radial or height direction, but the transverse elements 32 are accommodated in the push belt 3 so as to be displaceable in the circumferential direction of the ring sets 31, so that, in use, the rotation of the driving pulley 1 is transmitted via friction to the transverse elements 32 of the push belt 3 which are clamped thereby. This produces a considerable pushing force between the transverse elements 32, as a result of which they advance one another along the ring sets 31 in the direction of the driven pulley 2. Then, where the push belt 3 is clamped between the sheaves 4 and 5 of the driven pulley 2, said pushing force is transmitted thereto virtually entirely by way of friction. Finally, the transverse elements 32 push one another back from the driven pulley 2 to the driving pulley 1 when a relatively low pushing force is being exerted.

In FIG. 3, part of the driving pulley 1 of the transmission is illustrated by means of a cross section thereof including the central axis 9 of the pulley axle 6,7, i.e. viewed in the tangential direction. The cone surface 10 by means of which the pulley comes into contact with the contact surface 40 of the transverse elements 32, the so-called running surface 10, is shown to be convexly curved. The illustrated contour of the running surface 10 results in an angle $\lambda$ to the true radial direction, which angle $\lambda$ increases in the radially outward direction, that is to say in relation to said primary running radius Lr1. More particularly, the local contact angle $\lambda$(Lr1) becomes increasingly larger as the running radius Lr1 increases and vice versa. The convex shape of the running surface 10 in the cross section thereof oriented in tangential direction is in this case also determined by a local radius of curvature R10 in relation to the running radius Lr1, or the curve R10(Lr1) of the running surface 10.

As the prior art, as represented, for example, by NL-A-1024918, only specifies a lowest value λ(Lr1-min) for smallest running radius Lr1-min and a highest value λ(Lr1-max) for the largest running radius Lr1-max with respect to the local contact angle λ(Lr1), the contour of the running surface 10 of a pulley 1, 2 in the cross section of including its central axis 9 in between such extreme running radii Lr1-min, Lr1-max can to some degree still be selected freely. The contour which is most obvious in this connection is a true arc shape, i.e. a running surface 10 having a constant radius of curvature R10, which therefore does not vary in relation to the running radius Lr1. However, according to the present invention, it is advantageous if the radius of curvature R10 of the running surfaces 10 of the pulley sheaves 4, 5 of the driving pulley 1 decreases in relation to an increasing running radius Lr1 of the drive belt 3, as is illustrated in FIG. 3 by means of the fixed pulley sheave 5 of the driving pulley 1. This means that, according to the invention, the radius of curvature R10 of the running surface 10 of the driving pulley 1 has to decrease from said smallest running radius Lr1-min, i.e. the top of the cone shape of the running surface 10 in the direction of said largest running radius Lr1-max, i.e. the base of the cone shape of the running surface 10, preferably evenly.

In addition, according to the present invention and at least specifically when the transmission is used in a motor vehicle, the opposite is the case for the driven pulley 2, namely that it is advantageous if the radius of curvature R10 of the running surfaces 10 of the pulley sheaves 4, 5 of the driven pulley 2 increases in relation to an increasing secondary running radius Lr2 of the drive belt 3, i.e. in the direction from the tip to the base of the cone shape of said running surfaces 10.

FIGS. 4-5 show a preferred embodiment of the local radius of curvature of the contours specified now for running surfaces 10 of the driving pulley 1 and the driven pulley 2, respectively, by means of two graphs in which the respective radius of curvature R10 is plotted as a function of the above-mentioned running radii Lr1 and Lr2 and of the ratio between them, i.e. the transmission ratio Lr2/Lr1 of the transmission. The contours of the radius of curvature R10 shown for both pulleys 1, 2 of the transmission specifically apply for a range of contact angles from approximately 7 degrees to approximately 11 degrees for the driving pulley 1 and from approximately 7 degrees to approximately 9 degrees for the driven pulley 2.

The invention claimed is:

1. A Continuously variable transmission for motor vehicles, comprising:
   a driving pulley (1);
   a driven pulley (2),
   the driving pulley and driven pulley each comprising a central axis (9) and two substantially conical pulley sheaves (4, 5), each pulley sheave having a cone surface (10) with a convexly curved contour in a cross-section that includes the central axis (9) of the respective pulley; and
   a drive belt (3) arranged around the driving pulley and the driven pulley, wherein,
   at least when the transmission is operating, the drive belt is clamped between the two substantially conical pulley sheaves (4, 5) of the driving and driven pulleys (1, 2),
   a local radius of curvature (R10) of the convex contour of the cone surface (10) of the pulley sheaves (4, 5) of the driving pulley (1) decreases in radially outward direction, and
   a local radius of curvature (R10) of the convex contour of the cone surface (10) of the pulley sheaves (4, 5) of the driven pulley (2) increases in radially outward direction, wherein a largest local radius of curvature associated with the driven pulley is smaller than a largest local radius of curvature associated with the driven pulley.

2. The continuously variable transmission according to claim 1, wherein the local radius of curvature (R10) associated with the driving pulley (1) decreases by a factor of between 2 and 3 along an overall radial dimension thereof.

3. The continuously variable transmission according to claim 2, in which the local radius of curvature (R10) associated with the driven pulley (2) increases by a factor of between 1.5 and 2 along the overall radial dimension thereof.

4. The continuously variable transmission according to claim 2, wherein a smallest local radius of curvature (R10) associated with the driving pulley (1) is smaller than a smallest local radius of curvature (R10) associated with the driven pulley (2).

5. The continuously variable transmission according to claim 2, wherein a smallest local radius of curvature (R10) associated with the driven pulley (2) is smaller than a largest local radius of curvature (R10) associated with the driving pulley (1).

6. The continuously variable transmission according to claim 2, wherein the local radius of curvature (R10) of the convex contour of the cone surfaces (10) of the pulley sheaves (4, 5) of the driving pulley (1) and of the driven pulley (2) have a value in the range from 500 mm to 2500 mm along the overall radial dimension thereof.

7. The continuously variable transmission according to claim 1, wherein the local radius of curvature (R10) associated with the driven pulley (2) increases by a factor of between 1.5 and 2 along an overall radial dimension thereof.

8. The continuously variable transmission according to claim 7, wherein a smallest local radius of curvature (R10) associated with the driving pulley (1) is smaller than a smallest local radius of curvature (R10) associated with the driven pulley (2).

9. The continuously variable transmission according to claim 7, wherein a smallest local radius of curvature (R10) associated with the driven pulley (2) is smaller than a largest local radius of curvature (R10) associated with the driving pulley (1).

10. The continuously variable transmission according to claim 7, wherein the local radius of curvature (R10) of the convex contour of the cone surfaces (10) of the pulley sheaves (4, 5) of the driving pulley (1) and of the driven pulley (2) have a value in the range from 500 mm to 2500 mm along the overall radial dimension thereof.

11. The continuously variable transmission according to claim 1, characterized in that a smallest local radius of curvature (R10) associated with the driving pulley (1) is smaller than a smallest local radius of curvature (R10) associated with the driven pulley (2).

12. The continuously variable transmission according to claim 11, wherein the smallest local radius of curvature (R10) associated with the driven pulley (2) is smaller than a largest local radius of curvature (R10) associated with the driving pulley (1).

13. The continuously variable transmission according to claim 1, wherein a smallest local radius of curvature (R10) associated with the driven pulley (2) is smaller than a largest local radius of curvature (R10) associated with the driving pulley (1).

14. The continuously variable transmission according to claim 1, wherein the local radius of curvature (R10) of the convex contour of the cone surfaces (10) of the pulley sheaves (4, 5) of the driving pulley (1) and of the driven pulley (2) have a value in the range from 500 mm to 2500 mm along an overall radial dimension thereof.

15. The continuously variable transmission according to claim 1, wherein a smallest local radius of curvature (R10) associated with the driven pulley (2) is smaller than the largest local radius of curvature (R10) associated with the driving pulley (1).

16. A Continuously variable transmission for motor vehicles, comprising:
- a driving pulley (1);
- a driven pulley (2),
- the driving pulley and driven pulley each comprising a central axis (9) and two substantially conical pulley sheaves (4, 5), each pulley sheave having a cone surface (10) with a convexly curved contour in a cross-section that includes the central axis (9) of the respective pulley; and
- a drive belt (3) arranged around the driving pulley and the driven pulley, wherein,
- at least when the transmission is operating, the drive belt is clamped between the two substantially conical pulley sheaves (4, 5) of the driving and driven pulleys (1, 2),
- a local radius of curvature (R10) of the convex contour of the cone surface (10) of the pulley sheaves (4, 5) of the driving pulley (1) decreases in radially outward direction in relation to an increasing running radius (Lr1) of the drive belt (3),
- a local radius of curvature (R10) of the convex contour of the cone surface (10) of the pulley sheaves (4, 5) of the driven pulley (2) increases in radially outward direction in relation to a increasing running radius (Lr2) of the drive belt (3),
- a smallest local radius of curvature (R10) associated with the driving pulley (1) is smaller than a smallest local radius of curvature (R10) associated with the driven pulley (2),
- the smallest local radius of curvature (R10) associated with the driven pulley (2) is smaller than a largest local radius of curvature (R10) associated with the driving pulley (1), and
- a largest local radius of curvature (R10) associated with the driven pulley (2) is larger than the smallest local radius of curvature (R10) associated with the driving pulley (1) wherein a largest local radius of curvature associated with the driven pulley is smaller than a largest local radius of curvature associated with the driven pulley.

* * * * *

UNITED STATES PATENT AND TRADEMARK OFFICE
CERTIFICATE OF CORRECTION

PATENT NO.       : 8,491,426 B2                                       Page 1 of 1
APPLICATION NO. : 12/990708
DATED            : July 23, 2013
INVENTOR(S)      : Arjan Van Der Leest It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 409 days.

Signed and Sealed this
Eighth Day of September, 2015

Michelle K. Lee
*Director of the United States Patent and Trademark Office*